US012669170B2

(12) United States Patent
Dumas et al.

(10) Patent No.: US 12,669,170 B2
(45) Date of Patent: Jun. 30, 2026

(54) CONTROL OF A LIMITED SLIP DIFFERENTIAL FOR A VEHICLE

(71) Applicant: BOMBARDIER RECREATIONAL PRODUCTS INC., Valcourt (CA)

(72) Inventors: Francois-Charles Dumas, Saint-Denis-de-Brompton (CA); Joel Cote, Sherbrooke (CA); Frederic Larin, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 19/233,536

(22) Filed: Jun. 10, 2025

(65) Prior Publication Data

US 2025/0383013 A1 Dec. 18, 2025

Related U.S. Application Data

(60) Provisional application No. 63/658,892, filed on Jun. 12, 2024.

(51) Int. Cl.
*F16H 48/22* (2006.01)
*F16H 48/34* (2012.01)
(Continued)

(52) U.S. Cl.
CPC .............. *F16H 48/22* (2013.01); *F16H 48/34* (2013.01); *B60W 10/12* (2013.01); *B60W 10/16* (2013.01);
(Continued)

(58) Field of Classification Search
CPC ... F16H 48/22; B60W 10/16; B60W 2510/22; B60W 2710/125
See application file for complete search history.

(56) References Cited

U.S. PATENT DOCUMENTS 8,271,177 B2 * 9/2012 Okamoto ................ F16H 48/10
701/72
10,836,252 B2 11/2020 Dumas et al.
(Continued)

FOREIGN PATENT DOCUMENTS

WO 2023031830 A1 3/2023

OTHER PUBLICATIONS

BRP; CAN-AN—Smart-Lok™ Technology; Sep. 20, 2017; retrieved from https://www.youtube.com/watch?v=Nj0R66JuBQk on Jun. 4, 2025.

(Continued)

*Primary Examiner* — Derek D Knight
(74) *Attorney, Agent, or Firm* — BCF LLP

(57) ABSTRACT

A control system for controlling a limited-slip differential (LSD) of a vehicle, the vehicle having an engine and left and right ground-engaging elements, the vehicle having the LSD operatively connectable to a driveshaft and to the left and right ground-engaging elements, left and right suspension assemblies connected to the left and right ground-engaging elements, the LSD being adapted for transferring torque from the driveshaft to the left and right ground-engaging elements. The control system includes at least one sensor determining indications of positions of the right and left suspensions or ground-engaging members; and a control unit operatively connected to the LSD and to the sensor, the control unit being configured to execute: receiving sensor signals from the sensor, generating a control signal at least partly based on the sensor signals, and controlling selective locking of the LSD based on the control signal.

20 Claims, 12 Drawing Sheets

(51) Int. Cl.
  *B60W 10/12* (2012.01)
  *B60W 10/16* (2012.01)
  *F16H 48/20* (2012.01)
(52) U.S. Cl.
  CPC ... *B60W 2510/22* (2013.01); *B60W 2710/125*
     (2013.01); *F16H 2048/204* (2013.01)

(56) References Cited

U.S. PATENT DOCUMENTS

| | | |
|---|---|---|
| 10,962,097 B2 | 3/2021 | Dumas et al. |
| 11,378,167 B2 | 7/2022 | Dumas et al. |
| 11,383,599 B2 | 7/2022 | Dumas et al. |
| 11,674,578 B2 | 6/2023 | Dumas et al. |

OTHER PUBLICATIONS

BRP; CAN-AN—Smart-Lok technology; May 2024; retrieved from
https://can-am.brp.com/off-road/ca/en/can-am-world/technologies/
smart-lok-technology.html on Jun. 4, 2025.
Kyocera Avx; Standard Sensors; retrieved from https://sc.kyocera-
avx.com/products/sensing/standard-products/standard-sensors-2/ on
Jun. 4, 2025.

* cited by examiner

499

Figure 12:
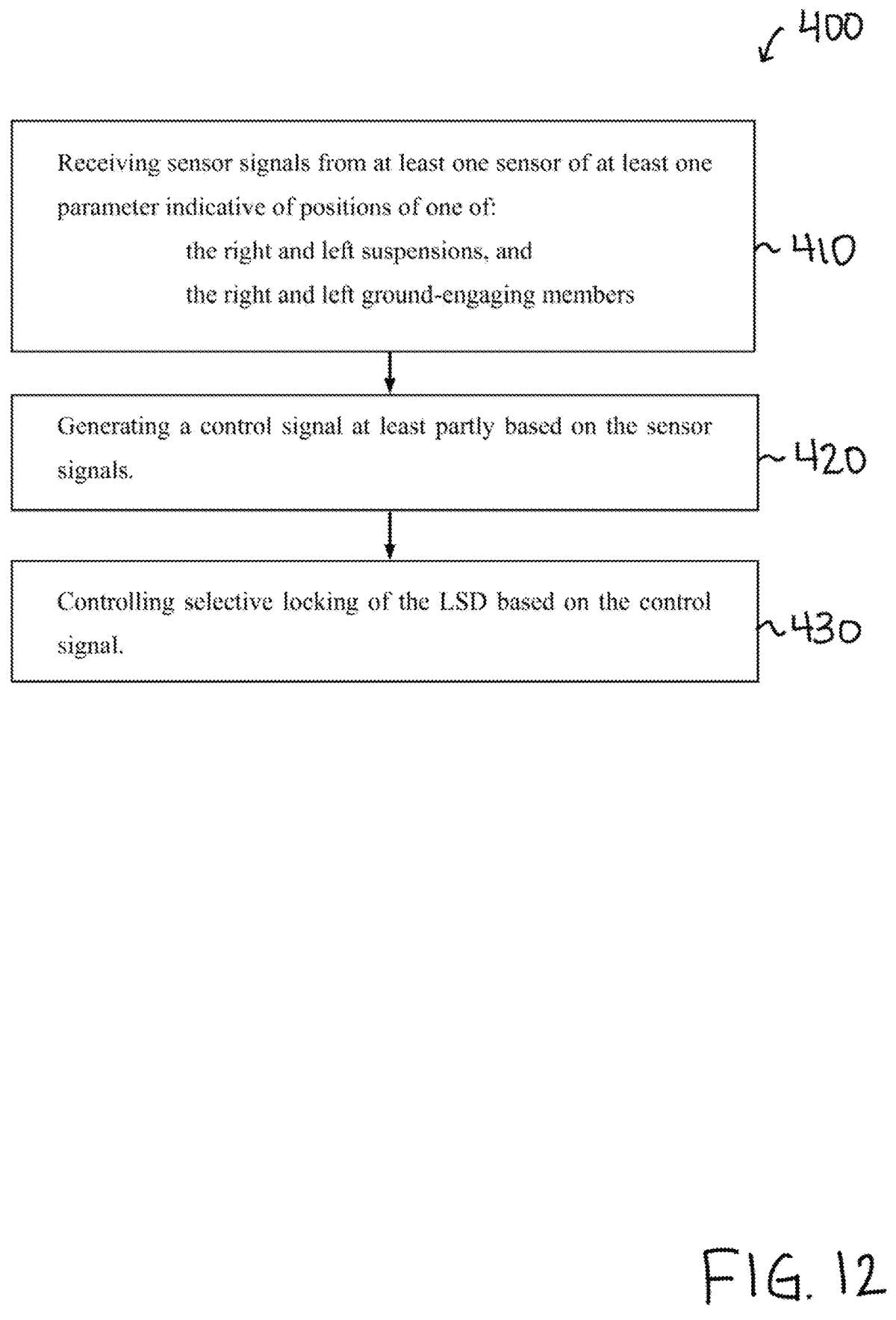

400

Receiving sensor signals from at least one sensor of at least one parameter indicative of positions of one of:

the right and left suspensions, and the right and left ground-engaging members

~410

Generating a control signal at least partly based on the sensor signals.

~420

Controlling selective locking of the LSD based on the control signal.

Figure 13:
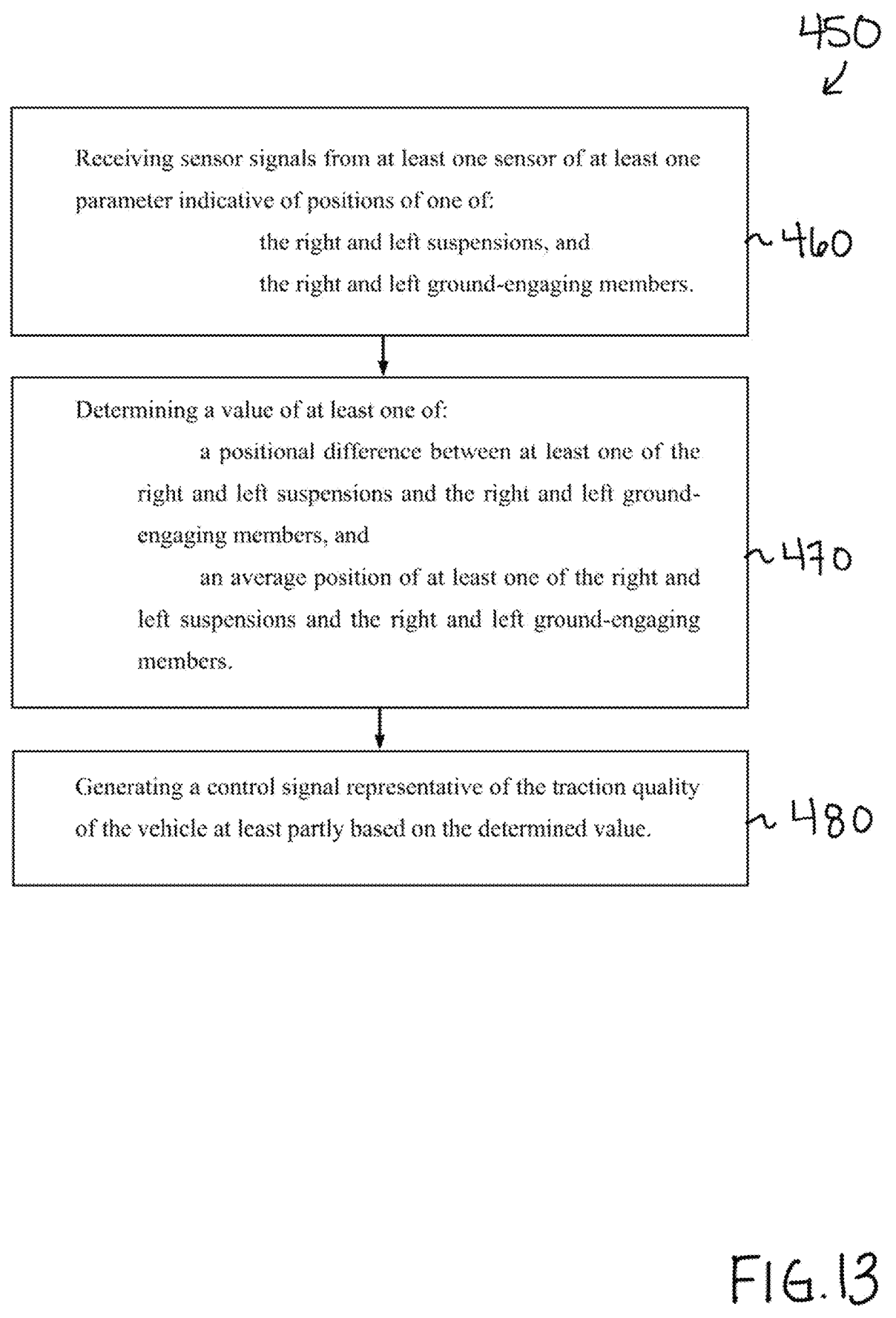

Receiving sensor signals from at least one sensor of at least one parameter indicative of positions of one of:

the right and left suspensions, and the right and left ground-engaging members.

~460

Determining a value of at least one of:

a positional difference between at least one of the right and left suspensions and the right and left ground-engaging members, and an average position of at least one of the right and left suspensions and the right and left ground-engaging members.

~470

Generating a control signal representative of the traction quality of the vehicle at least partly based on the determined value.

CONTROL OF A LIMITED SLIP DIFFERENTIAL FOR A VEHICLE

CROSS-REFERENCE

The present application claims priority to U.S. Provisional Patent Application No. 63/658,892, entitled "Control of a Limited Slip Differential for a Vehicle," filed Jun. 12, 2024, the entirety of which is incorporated by reference herein.

FIELD OF TECHNOLOGY

The present technology relates to a control of a limited slip differential for a vehicle.

BACKGROUND

There exist various types of vehicles used mainly in off-road conditions. One such type is the side-by-side off-road vehicle. The name "side-by-side" refers to the seating arrangement of the vehicle in which the driver and a passenger are seated side-by-side. Some side-by-side off-road vehicles also have a second row of seats to accommodate one or more additional passengers. These vehicles typically have an open cockpit, a roll cage and a steering wheel.

To be able to operate in off-road conditions, a side-by-side off-road vehicle needs to be able to handle bumpy terrain and to operate on various surfaces including, but not limited to, sand, dirt and mud. These conditions represent unique challenges not typically encountered when designing on-road vehicles such as cars. One such challenge lies in the provision of torque to each driving wheel under various conditions such as amount of steering, vehicle orientation when climbing a hill, rate of acceleration, rocky terrain, and the like.

A differential is commonly used to receive torque from a driving shaft and to redirect the torque via half-shafts toward two driving wheels of the vehicle. The differential allows the half-shafts and corresponding wheels to rotate at different rates from each other, as it is desirable to allow the inside wheel to rotate at a somewhat lower rate than the outside wheel when the vehicle is in a turn. However, when one of the wheels is on slippery terrain, the differential may direct all torque on that one wheel, which may spin unnecessarily without allowing the vehicle to move, no torque being delivered on the other wheel. A limited slip differential (LSD) is conventionally used to limit the rotational speed difference between left and right driven wheels of a wheel set. In a vehicle equipped with a LSD, should the left wheel (for example) be on a patch of low friction terrain, it will only spin to a small extent before the LSD starts transmitting torque on the opposite right wheel. As the right wheel may be on terrain providing better traction, this allows the vehicle to move until both wheels are on terrain providing better traction.

When a vehicle is travelling in rocky or rock crawling conditions, the torque being applied to the wheels may change frequently and may change by a large amount. For instance, one wheel may lose contact with the ground while crawling over a rock, causing the wheel to spin. This could cause the LSD to constantly lock and unlock again. This behavior of the LSD is not only inefficient, but may be detrimental to the driving experience while potentially causing premature damage to the LSD. Some LSDs have a manual locking mode that may be used to overcome this constant locking and unlocking problem. The user of the vehicle may manually lock the LSD, for example when the user predicts that the vehicle is about to encounter a rocky terrain. The LSD remains locked until unlocked by the user. While this may help preventing that the vehicle becomes stuck, it may render the vehicle difficult to drive if the LSD is still manually locked when better surface conditions are met again, steering becoming difficult for example. In some off-road paths, the user might need to frequently lock and unlock again the LSD.

There is therefore a desire for a control of limited slip differentials that addresses the above issues.

SUMMARY

It is an object of the present technology to ameliorate at least some of the inconveniences present in the prior art.

The present technology provides a limited slip differential (LSD) controlled according to one or more parameters indicative of a traction quality or indicative of a rock crawling operational mode of a vehicle. In order to improve LSD performance, one way this is performed is to identify which of the driven wheels has the best potential of traction. By the present technology, suspension position is used, alone or in combination with other factors, as it may indicate which wheels are applying the most pressure to the ground.

The LSD is selectively partially or fully locked, by a controller, when a rock crawling driving condition is detected based on the wheel or suspension positions. The rock crawling driving condition may be detected under one or more of the following conditions. In some situations, the rock crawling driving condition is detected based on a left-right (or lateral) difference between the suspension extensions being detected by suspension sensors. For example, in some cases when driving over rocky terrain, one front wheel may be supporting the load of the vehicle while the other front wheel and suspension are in a full droop position (perhaps dangling in the air or in light contact with a lower portion of the ground relative to the other wheel). In other situations, the rock crawling driving condition is detected based on a front-rear suspension extension determination being detected by suspension sensors, specifically checking if the rear suspension is in or is moving toward the full droop position. For example, in some cases when driving over rocky terrain, the front wheels may be supporting the load of the vehicle while the rear wheels and suspension are in a full droop position, for example as vehicle is going over a hump such that the bottom of the vehicle is sitting against that hump, pushing the rear suspension towards full droop. In this case, the front driven wheels would need to supply more effort to move the vehicle. By the present technology, a suspension sensor is operatively connected to each suspension assembly to sense an extension position of the suspension and/or a vertical positioning of the corresponding wheel relative to the frame of the vehicle.

According to one aspect of the present technology, there is provided a control system for controlling a limited-slip differential (LSD) of a vehicle, the vehicle having an engine and left and right ground-engaging elements, the vehicle having the LSD operatively connectable to a driveshaft and to the left and right ground-engaging elements, left and right suspension assemblies connected to the left and right ground-engaging elements, the LSD being adapted for transferring torque from the driveshaft to the left and right ground-engaging elements. The control system includes at least one sensor of at least one parameter indicative of positions of one of: the right and left suspensions, and the right and left ground-engaging members; and a control unit operatively connected to the LSD and to the at least one sensor. The control unit being configured to execute receiving sensor signals from the at least one sensor, generating a control signal at least partly based on the sensor signals, and controlling selective locking of the LSD based on the control signal.

In some implementations, the control unit is further configured to execute determining a positional difference between one of: positions of the right and left suspensions, and positions of the right and left ground-engaging members.

In some implementations, generating the control signal is based on the positional difference, the control signal being indicative of a traction quality of the right and left ground-engaging members.

In some implementations, the positional difference is a first positional difference; the control unit is further configured to execute: determining a second positional difference between one of: positions of the right and left suspensions, and positions of the right and left ground-engaging members, the second positional difference being determined subsequent to the first positional difference; generating the control signal is based on the first positional difference and the second positional difference; and in response to the second positional difference being greater than the first positional difference, controlling selective locking of the LSD comprises increasing a load on the LSD.

In some implementations, the control unit is configured to execute increasing the load on the LSD in response to a difference between the second positional difference and the positional difference being greater than above a pre-determined threshold.

In some implementations, the pre-determined threshold corresponds to between 10% and 30% of a travel of right and left front suspensions.

In some implementations, the pre-determined threshold corresponds to about 10% of the travel of the right and left front suspensions.

In some implementations, the pre-determined threshold is between about 60 mm and about 90 mm.

In some implementations, the pre-determined threshold is about 75 mm.

In some implementations, the pre-determined threshold is a function of a predicted engine torque of the engine.

In some implementations, the control unit is further configured to execute determining an average compression position of the right and left suspensions, and the right and left ground-engaging members.

In some implementations, the control unit is further configured to execute generating the control signal based on the average compression position, the control signal being indicative of a traction characteristic of the right and left ground-engaging members.

In some implementations, the control unit is further configured to execute in response to the average compression position approaching a full droop position, controlling selective locking of the LSD by increasing a load on the LSD.

In some implementations, the control unit is further configured to execute in response to the average compression position being above a pre-determined compression threshold, controlling selective locking of the LSD by increasing a load on the LSD.

In some implementations, the pre-determined compression threshold corresponds to a suspension droop position of between 60% and 80%.

In some implementations, the pre-determined compression threshold corresponds to a suspension droop position of 70%.

In some implementations, the pre-determined compression threshold is between about 245 mm and about 325 mm.

In some implementations, the pre-determined compression threshold is about 285 mm.

In some implementations, the pre-determined compression threshold is a function of a predicted engine torque of the engine.

In some implementations, the control unit is further configured to execute determining an average front compression position of one of right and left front suspensions, and right and left front ground-engaging members; and determining an average rear compression position of one of right and left rear suspensions, and right and left rear ground-engaging members.

In some implementations, controlling selective locking of the LSD by the control unit comprises controlling a front LSD of the vehicle.

In some implementations, the control unit is further configured to execute receiving at least one vehicle sensor signal indicative of at least one operational condition of the vehicle; and generating the control signal further comprises generating the control signal based on the at least one vehicle sensor signal.

In some implementations, the at least one operational condition includes at least one of a speed of front ground-engaging members; a steering indication; an accelerator indication; a gear position; an engine torque; and a speed of the vehicle.

In some implementations, generating the control signal further includes determining a first load to be applied to the LSD based on the sensor signals, and determining a second load to be applied to the LSD based on the at least one vehicle sensor signal; and controlling selective locking of the LSD based on the control signal comprises applying a sum of the first load and the second load to the LSD.

In some implementations, the control unit is further configured to execute receiving an indication of a riding mode selection; in response to a pre-determined riding mode of the vehicle having been selected generating the control signal based on the sensor signals, and controlling selective locking of the LSD based on the control signal; and in response to an other riding mode of the vehicle having been selected generating an other mode control signal based on the at least one vehicle sensor signal, and controlling selective locking of the LSD based on the other mode control signal.

In some implementations, the control unit is further configured to execute receiving an indication of a riding mode selection; and in response to the indication of riding mode selection of the vehicle having been selected generating the control signal, and controlling selective locking of the LSD based on the control signal.

According to another aspect of the present technology, there is provided a method of controlling a limited slip differential (LSD) of a vehicle, the vehicle having an engine and left and right ground-engaging elements, the vehicle having the LSD operatively connectable to a driveshaft and to the left and right ground-engaging elements, left and right suspension assemblies connected to the left and right ground-engaging elements, the LSD being adapted for transferring torque from the driveshaft to the left and right ground-engaging elements, receiving, by a control unit operatively connected to the LSD, sensor signals from at least one sensor of at least one parameter indicative of positions of one of the right and left suspensions, and the right and left ground-engaging members; generating, by the control unit, a control signal at least partly based on the sensor signals; and controlling, by the control unit, selective locking of the LSD based on the control signal.

In some implementations, the method further includes determining a positional difference between one of: positions of the right and left suspensions, and positions of the right and left ground-engaging members.

In some implementations, generating the control signal is based on the positional difference, the control signal being indicative of a traction characteristic of the right and left ground-engaging members.

In some implementations, determining the positional difference comprises determining a first positional difference; and the method further includes determining, subsequent to determining the first position difference, a second positional difference between one of positions of the right and left suspensions, and positions of the right and left ground-engaging members; generating the control signal comprises generating the control signal based on the first positional difference and the second positional difference; and in response to the second positional difference being greater than the first positional difference, controlling selective locking of the LSD comprises increasing a load on the LSD.

In some implementations, the method further includes increasing the load on the LSD in response to a difference between the second positional difference and first the positional difference being greater than above a pre-determined threshold.

In some implementations, the pre-determined threshold corresponds to between 10% and 30% of a travel of right and left front suspensions.

In some implementations, the pre-determined threshold corresponds to about 10% of the travel of the right and left front suspensions.

In some implementations, the pre-determined threshold is between about 60 mm and about 90 mm.

In some implementations, the pre-determined threshold is about 75 mm.

In some implementations, the pre-determined threshold is a function of a predicted engine torque of the engine.

In some implementations, the method further includes determining an average compression position of the right and left suspensions, and the right and left ground-engaging members.

In some implementations, the method further includes generating the control signal based on the average compression position, the control signal being indicative of a traction characteristic of the right and left ground-engaging members.

In some implementations, the method further includes in response to the average compression position approaching a full droop position, controlling selective locking of the LSD by increasing a load on the LSD.

In some implementations, the method further includes in response to the average compression position being above a pre-determined compression threshold, controlling selective locking of the LSD by increasing a load on the LSD.

In some implementations, the pre-determined compression threshold corresponds to a suspension droop position of between 60% and 80%.

In some implementations, the method further includes the pre-determined compression threshold corresponds to a suspension droop position of 70%.

In some implementations, the pre-determined compression threshold is between about 245 mm and about 325 mm.

In some implementations, the pre-determined compression threshold is about 285 mm.

In some implementations, the pre-determined compression threshold is a function of a predicted engine torque of the engine.

In some implementations, the method further includes determining an average front compression position of right and left front suspensions, and right and left front ground-engaging members; and determining an average rear compression position of right and left rear suspensions, and right and left rear ground-engaging members.

In some implementations, controlling selective locking of the LSD by the control unit comprises controlling a front LSD of the vehicle.

In some implementations, the method further includes receiving at least one vehicle sensor signal indicative of at least one operational condition of the vehicle; and generating the control signal further comprises generating the control signal based on the at least one vehicle sensor signal.

In some implementations, the at least one operational condition includes at least one of a speed of front ground-engaging members; a steering indication; an accelerator indication; a gear position; an engine torque; and a speed of the vehicle.

In some implementations, generating the control signal further includes determining a first load to be applied to the LSD based on the sensor signals, and determining a second load to be applied to the LSD based on the at least one vehicle sensor signal; and controlling selective locking of the LSD based on the control signal comprises applying a sum of the first load and the second load to the LSD.

In some implementations, the method further includes receiving an indication of a riding mode selection; in response to a pre-determined riding mode of the vehicle having been selected generating the control signal based on the sensor signals, and controlling selective locking of the LSD based on the control signal; and in response to an other riding mode of the vehicle having been selected generating an other mode control signal based on the at least one vehicle sensor signal, and controlling selective locking of the LSD based on the other mode control signal.

In some implementations, the method further includes receiving an indication of a riding mode selection; and in response to the indication of riding mode selection of the vehicle having been selected generating the control signal, and controlling selective locking of the LSD based on the control signal.

According to yet another aspect of the present technology, there is provided a control system for determining a traction quality of a vehicle, the vehicle having an engine and left and right ground-engaging elements, left and right suspension assemblies connected to the left and right ground-engaging elements, the control system including at least one sensor of at least one parameter indicative of positions of one of: the right and left suspensions, and the right and left ground-engaging members; and a control unit operatively connected to the at least one sensor. The control unit being configured to execute receiving sensor signals from the at least one sensor; determining a value of at least one of a positional difference between at least one of the right and left suspensions and the right and left ground-engaging members, and an average position of at least one of the right and left suspensions and the right and left ground-engaging members; and generating a control signal representative of the traction quality of the vehicle at least partly based on the value.

In some implementations, the vehicle having a limited-slip differential (LSD) operatively connectable to a drive-shaft and to the left and right ground-engaging elements, the LSD being adapted for transferring torque from the drive-shaft to the left and right ground-engaging elements, the control unit is further configured to execute controlling selective locking of the LSD based on the control signal representative of the traction quality.

In some implementations, the control unit is further configured to execute generating an indication representative of the traction quality; and communicating the indication to an operator of the vehicle.

According to yet another aspect of the present technology, there is provided a method for determining a traction quality of a vehicle, the vehicle having an engine and left and right ground-engaging elements, left and right suspension assemblies connected to the left and right ground-engaging elements. The method includes receiving, by a control unit, sensor signals from at least one sensor of at least one parameter indicative of positions of one of the right and left suspensions, and the right and left ground-engaging members; determining a value of at least one of a positional difference between at least one of the right and left suspensions and the right and left ground-engaging members, and an average position of at least one of the right and left suspensions and the right and left ground-engaging members; and generating a control signal representative of the traction quality of the vehicle at least partly based on the value.

In some implementations, the vehicle having a limited-slip differential (LSD) operatively connectable to a drive-shaft and to the left and right ground-engaging elements, the LSD being adapted for transferring torque from the drive-shaft to the left and right ground-engaging elements, the method further includes controlling selective locking of the LSD based on the control signal representative of the traction quality.

In some implementations, the method further includes generating an indication representative of the traction quality; and communicating the indication to an operator of the vehicle.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 12 is a flowchart illustrating a method for controlling the LSD; and

FIG. 13 is a flowchart illustrating a method for determining a traction quality of the vehicle.

DETAILED DESCRIPTION

Generally stated, the present technology provides control of a limited slip differential (LSD) mounted on an axle of a vehicle, this control being based at least in part on measurements provided by suspension or wheels sensors to a control unit operatively connected to the LSD.

The present technology will be described with respect to a four-wheel, off-road vehicle having two side-by-side seats and a steering wheel. However, it is contemplated that at least some aspects of the present technology may apply to other types of vehicles such as, but not limited to, off-road vehicles having a handlebar and a straddle seat (i.e. an all-terrain vehicle (ATV)), off-road vehicles having more or less than four wheels, and on-road vehicles having three or more wheels and having one or more seats.

Figure 1:
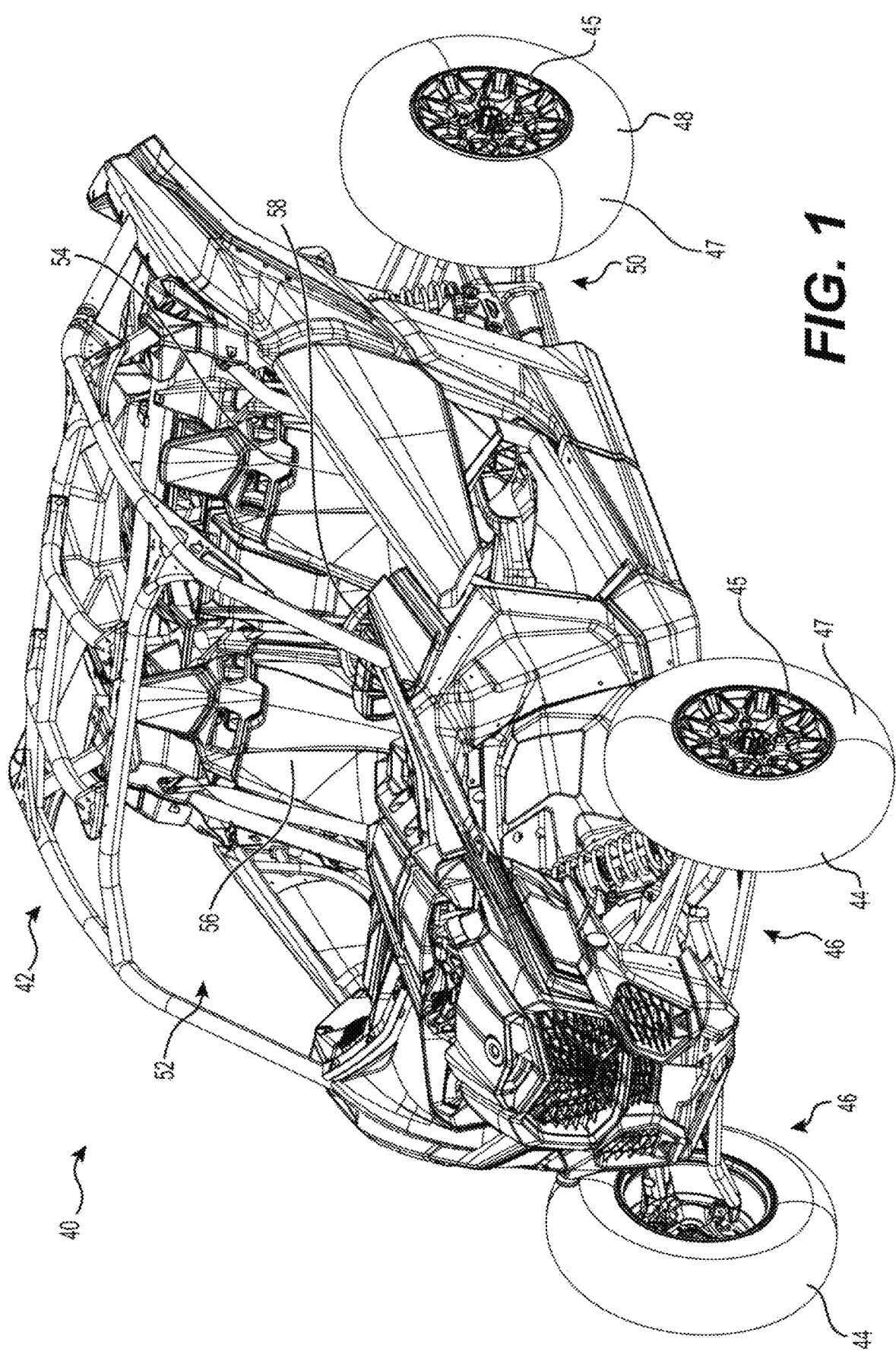
FIG. 1 is a perspective view of an off-road vehicle taken from a front, left side.

The general features of the off-road vehicle 40 will be described with respect to FIGS. 1, 2 and 3. The vehicle 40 has a frame 42, two front wheels 44 connected to a front of the frame 42 by a front suspension assembly 46 and two rear wheels 48 connected to the frame 42 by a rear suspension assembly 50. Each one of the front and rear wheels 44, 48 has a rim 45 and a tire 47. The rims 45 and tires 47 of the front wheels 44 may differ in size from the rims and tires of the rear wheels 48. In addition, although four wheels 44, 48 are illustrated in the Figures, the vehicle 40 could include more or less than four wheels 44, 48.

The frame 42 defines a central cockpit area 52 inside which are disposed a driver seat 54 and a passenger seat 56. In the present implementation, the driver seat 54 is disposed on the left side of the vehicle 40 and the passenger seat 56 is disposed on the right side of the vehicle 40. However, it is contemplated that the driver seat 54 could be disposed on the right side of the vehicle 40 and that the passenger seat 56 could be disposed on the left side of the vehicle 40. It is also contemplated that the vehicle 40 could include a single seat for the driver, or a larger number of seats, or a bench accommodating the driver and at least one passenger. The driver operates the steering wheel 58 from the driver seat 54 to control an angle of the front wheels 44.

Figure 2:
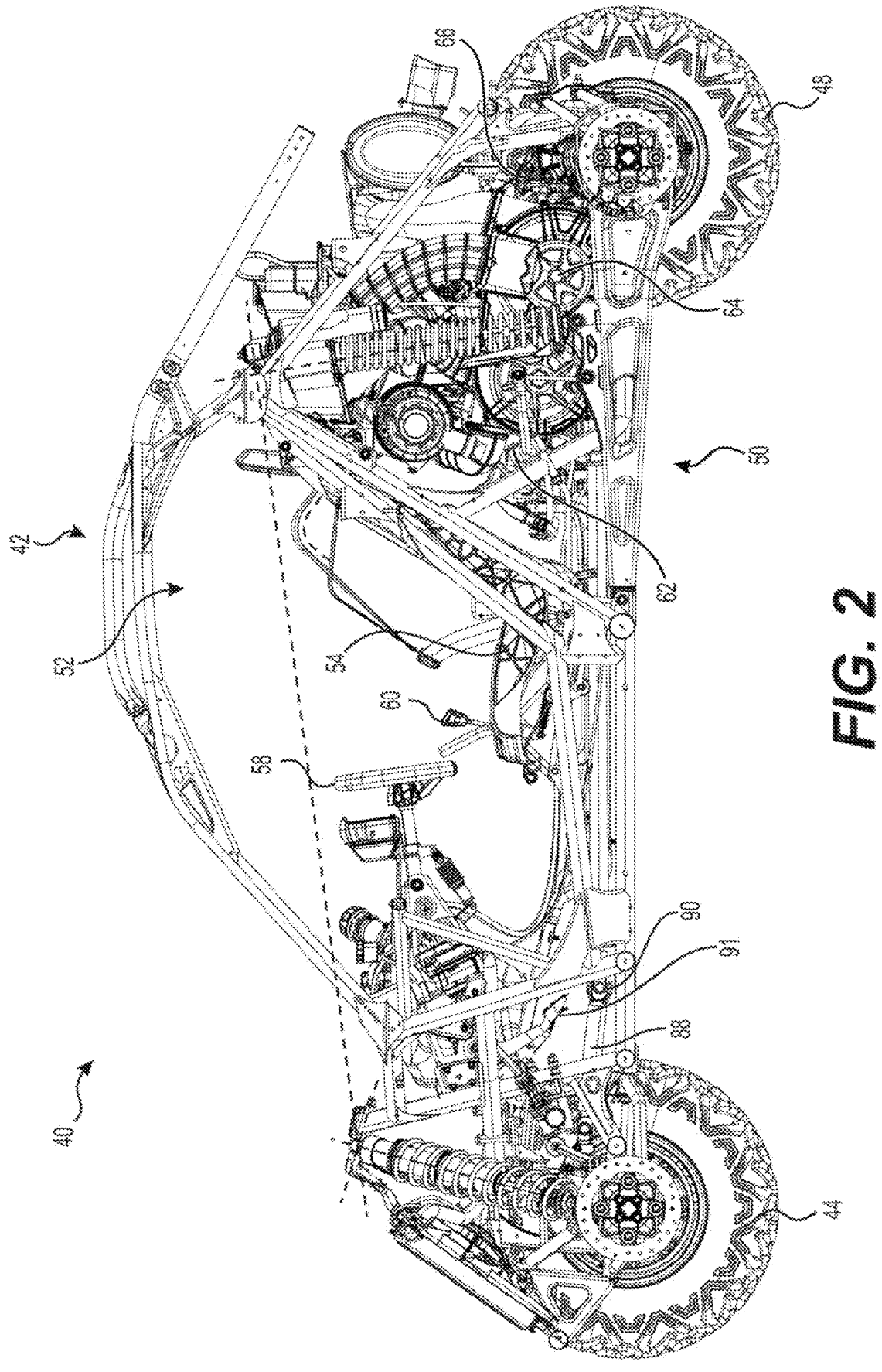
FIG. 2 is a left side elevation view of the vehicle of FIG. 1.
Figure 3:
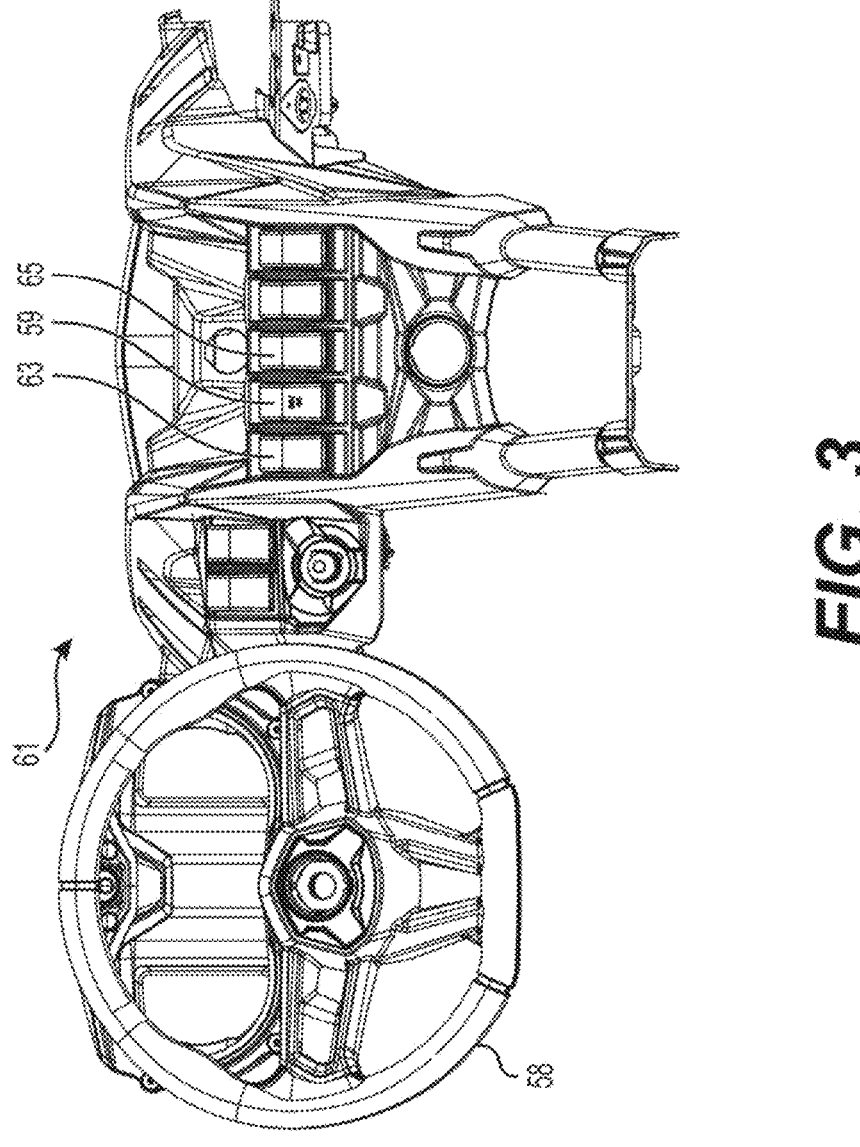
FIG. 3 is a rear elevation view of an instrument panel of the vehicle of FIG. 1.

As can be seen in FIG. 2, an engine 62 is connected to the frame 42 in a rear portion of the vehicle 40. The engine 62 is connected to a continuously variable transmission (CVT) 64 disposed on a left side of the engine 62. The CVT 64 is operatively connected to a transaxle 66 to transmit torque from the engine 62 to the transaxle 66. The transaxle 66 is disposed behind the engine 62. The transaxle 66 is operatively connected to the front and rear wheels 44, 48 to propel the vehicle 40. The engine 62, the CVT 64 and the transaxle 66 are supported by the frame 42. A variant of the vehicle 40 having another transmission type is also contemplated. For instance, different embodiments of the vehicle could include a powertrain having a dual-clutch transmission (DCT).

The transaxle 66 is mechanically connected to a shifter 60 disposed laterally between the two seats 54, 56. The shifter 60 allows the driver to select from a plurality of combinations of engagement of gears of the transaxle 66, commonly referred to as gears. In the present implementation, the shifter 60 allows the driver to select between a reverse gear, two forward gears (high and low) and a neutral position in which the transaxle 66 does not transmit torque to the wheels 44, 48. It is contemplated that other types of connections between the shifter 60 and the transaxle 66 could be used. In particular, in some embodiments of the vehicle 40, the shifter 60 may include one or more of: a gear shifter, a paddle shift, a keypad, etc.

In an implementation, operative connection of the transaxle 66 to the front wheels 44 is selectable, the selection being made using a drive mode selector provided in the vicinity of the driver. The drive mode selector in the present embodiment of the vehicle 40 is a toggle switch 59 (FIG. 3) mounted on an instrument panel 61 of the vehicle 40. A different type of switch or knob could be used. It is also contemplated that a keypad could be used. The toggle switch 59 has two (2) positions for selecting a two-wheel mode or an all-wheel mode for the vehicle 40. The drive mode selector also includes a toggle switch 63 having two (2) positions for manually locking and unlocking a limited slip differential (LSD) 302, described below in more detail. In some implementations, control of the LSD 302 may be restricted to control systems of the vehicle 40, described below. The drive mode selector further includes, optionally, a toggle switch 65 having two (2) positions for selecting one of a normal driving mode and a rock crawling mode. It is contemplated that the toggle switch 65 may have three or more positions to permit selection of one or more additional modes, including but not limited to: a trail active mode and a mud mode. Use of a rotary knob for selecting one of the various modes and use of distinct switches for turning on and off each of the trail active mode, mud mode and rock crawling mode are also contemplated. It is also contemplated to the rotary knob or additional toggle switches may be used to select other modes, for example a sand mode, a snow mode, and the like. It is also contemplated that the drive mode selector may be omitted in some implementations, and a given drive mode, such as the rock crawling mode, could be implemented automatically by a control unit 370 based on determination of a traction quality and/or a control signal based on sensor signals. Specifics of the control unit 370 and operation thereof are set out in further detail below.

Figures 4, 5:
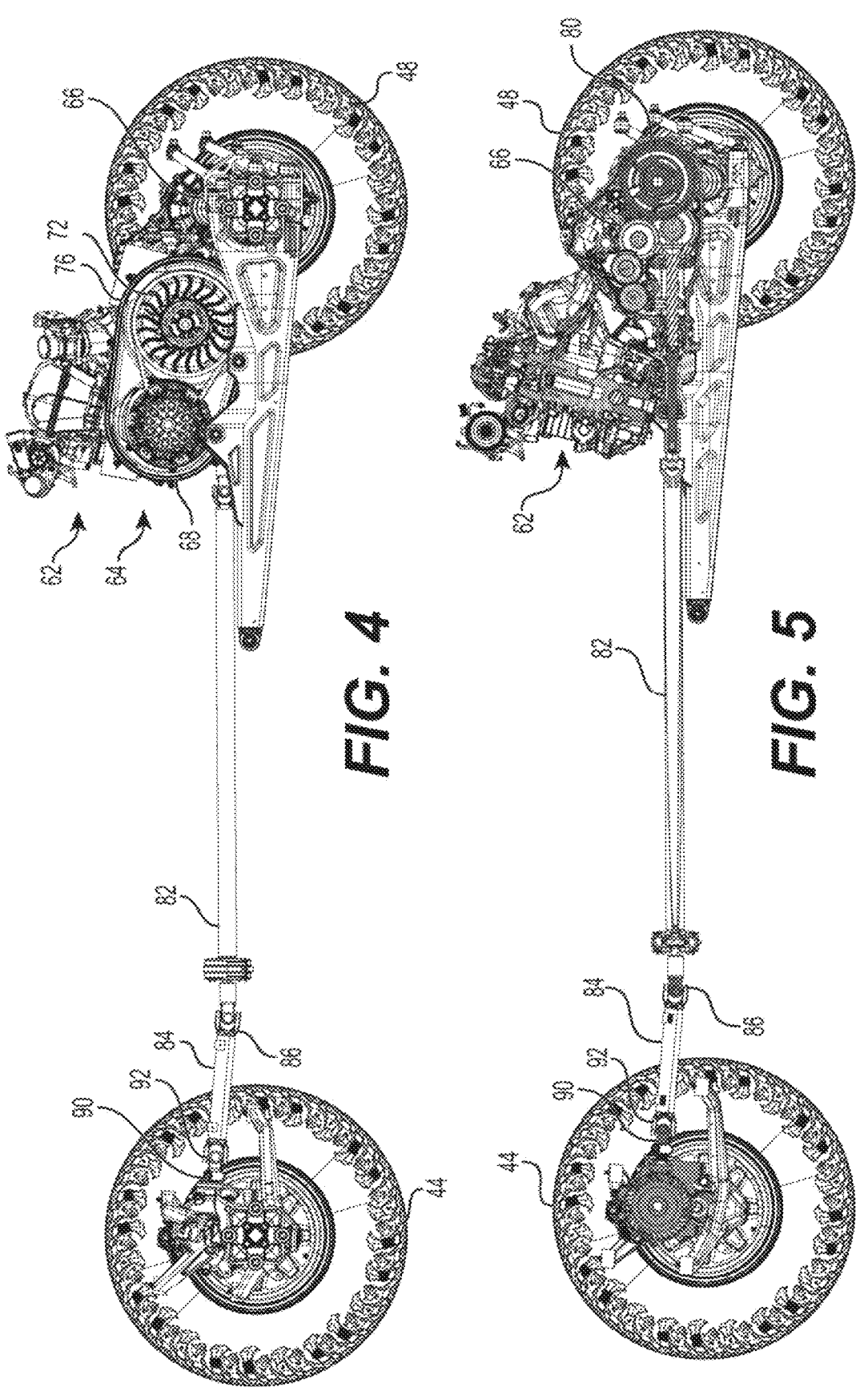
FIG. 4 is a left side elevation view of a powertrain of the vehicle of FIG. 1.
FIG. 5 is a left side cutaway view of the powertrain of FIG. 4.
Figure 6:
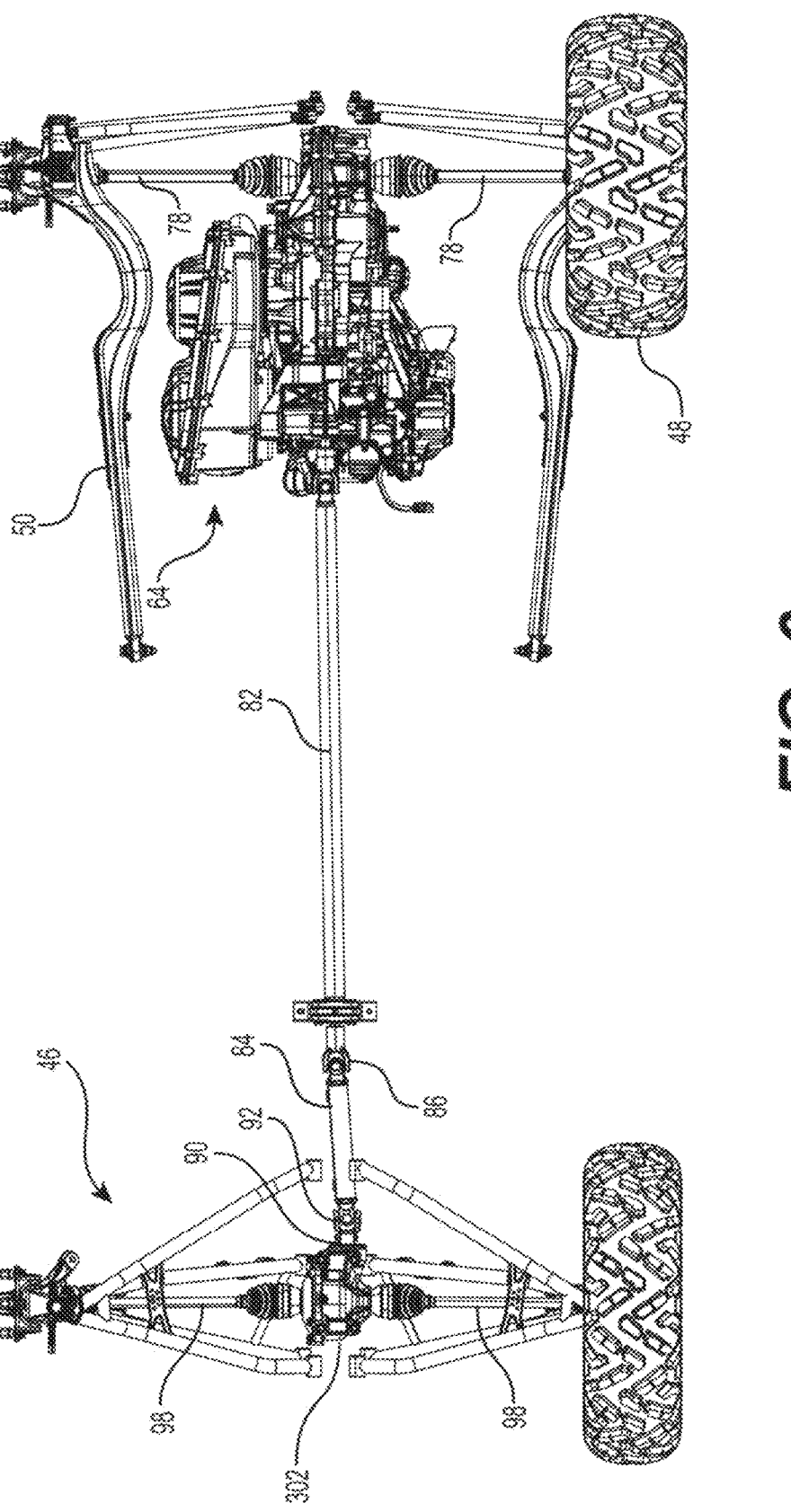
FIG. 6 is a bottom plan view of the powertrain FIG. 4.

Referring to FIGS. 4 to 6, the CVT 64 has a driving pulley 68 connected to and driven by the engine 62 as well as a driven pulley 72 mounted to the transaxle 66. A belt 76 transmits a torque imparted on the driving pulley 64 by the engine 62 to the driven pulley 72 that in turn transmits the torque to the transaxle 66. The driving pulley 68 and the driven pulley 72 permit a continuously variable transmission ratio by virtue of the opening or closing of opposed conical side faces of one or more of the pulleys. It should be understood that alternative transmission configurations may be used.

In the vehicle 40, the transaxle 66 transmits the torque applied thereon by the driven pulley 72 to drive the rear wheels 48, when the drive mode selector is in a two-wheel mode, or to drive the front and rear wheels 44, 48, when the drive mode selector in an all-wheel mode. The transaxle applies a torque to the rear wheels 48 via corresponding half-shafts 78. To this end, the transaxle 66 includes a differential 80 operatively connected to the half shafts 78. Instead of the differential 80, use of a spool gear is also contemplated. When the drive mode selector is in the all-wheel mode, the transaxle 66 applies a portion of the torque on the half shafts 78, and also applies another portion of the torque on a front driveshaft 82. A front end of the front driveshaft 82 is connected to another driveshaft 84 via a universal joint 86 or any other type of joint. A front end of the driveshaft 84 drives an input shaft 90 of the limited slip differential (LSD) 302 via another universal joint 92.

The LSD 302 is operatively connected to and drives left and right front half-shafts 98. Laterally outward ends of the front half-shafts 98 are operatively connected to and drive the front wheels 44. It is contemplated that the systems and methods described herein could be applied, mutatis mutandis, to a rear limited-slip differential in addition or alternatively to the front LSD 302.

Figure 7:
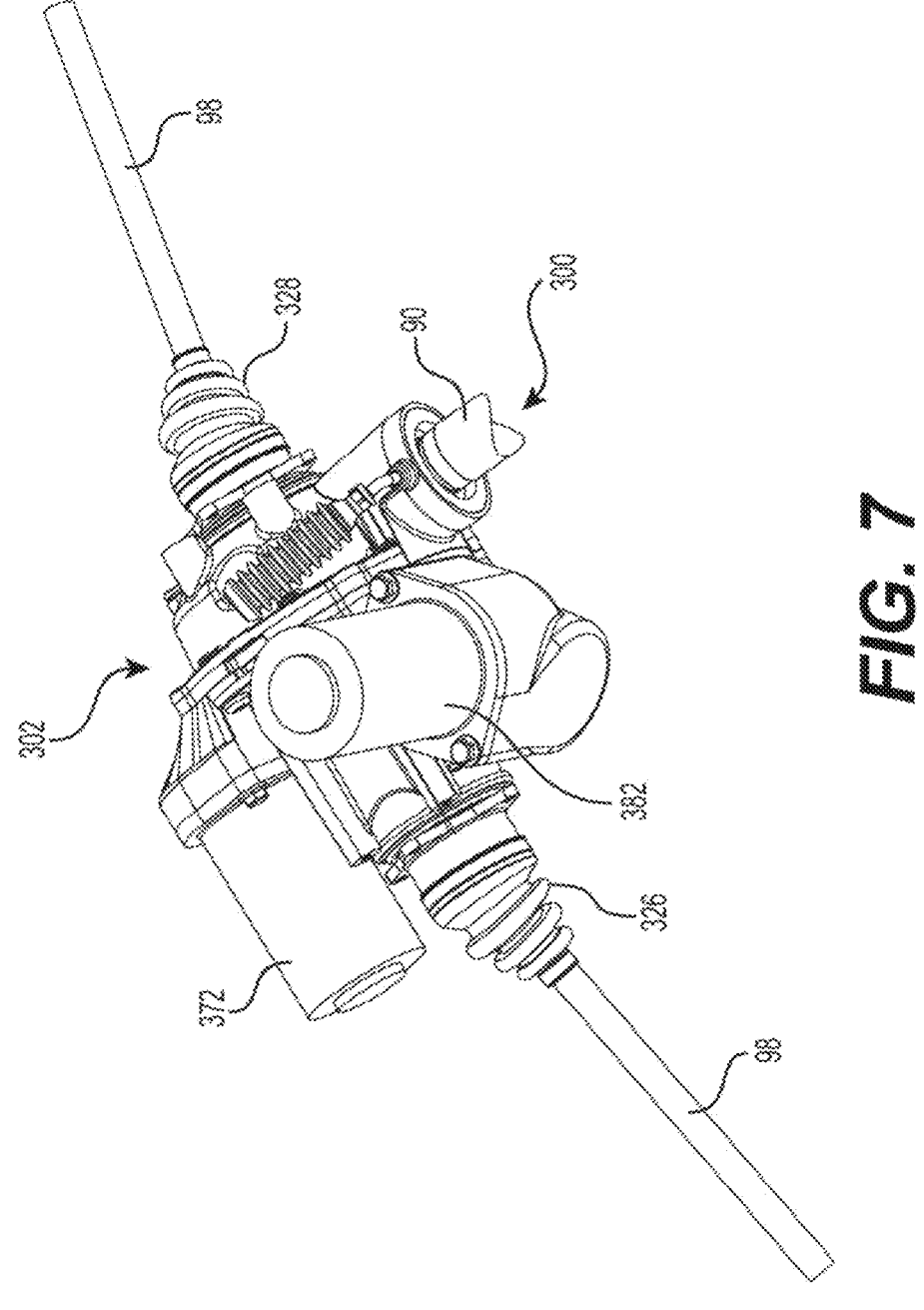
FIG. 7 is a perspective view, taken from a rear, left side, of a front differential assembly of the powertrain of FIG. 4.
Figure 8:
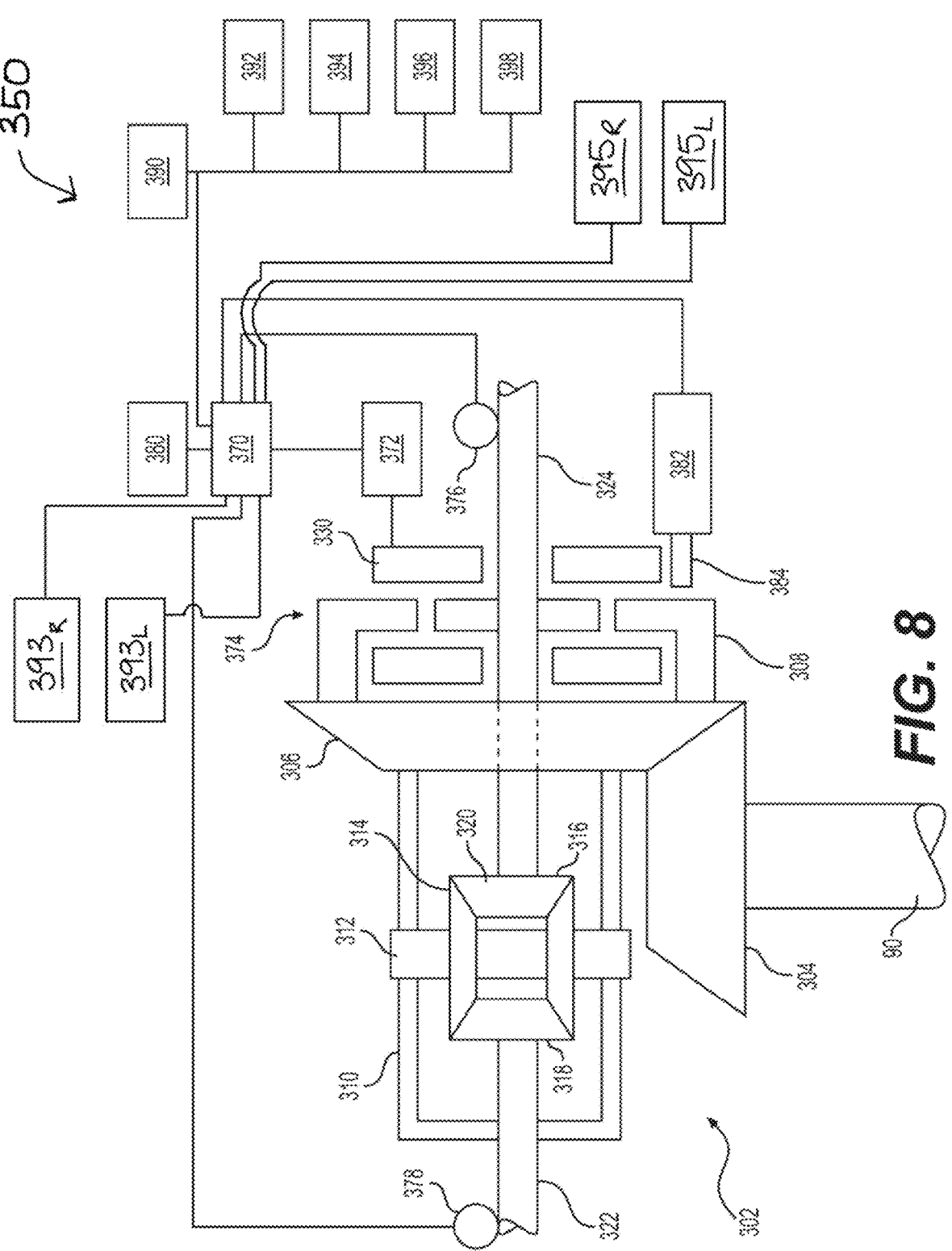
FIG. 8 is a schematic cross-sectional view of the differential assembly of FIG. 7.
Figure 9:
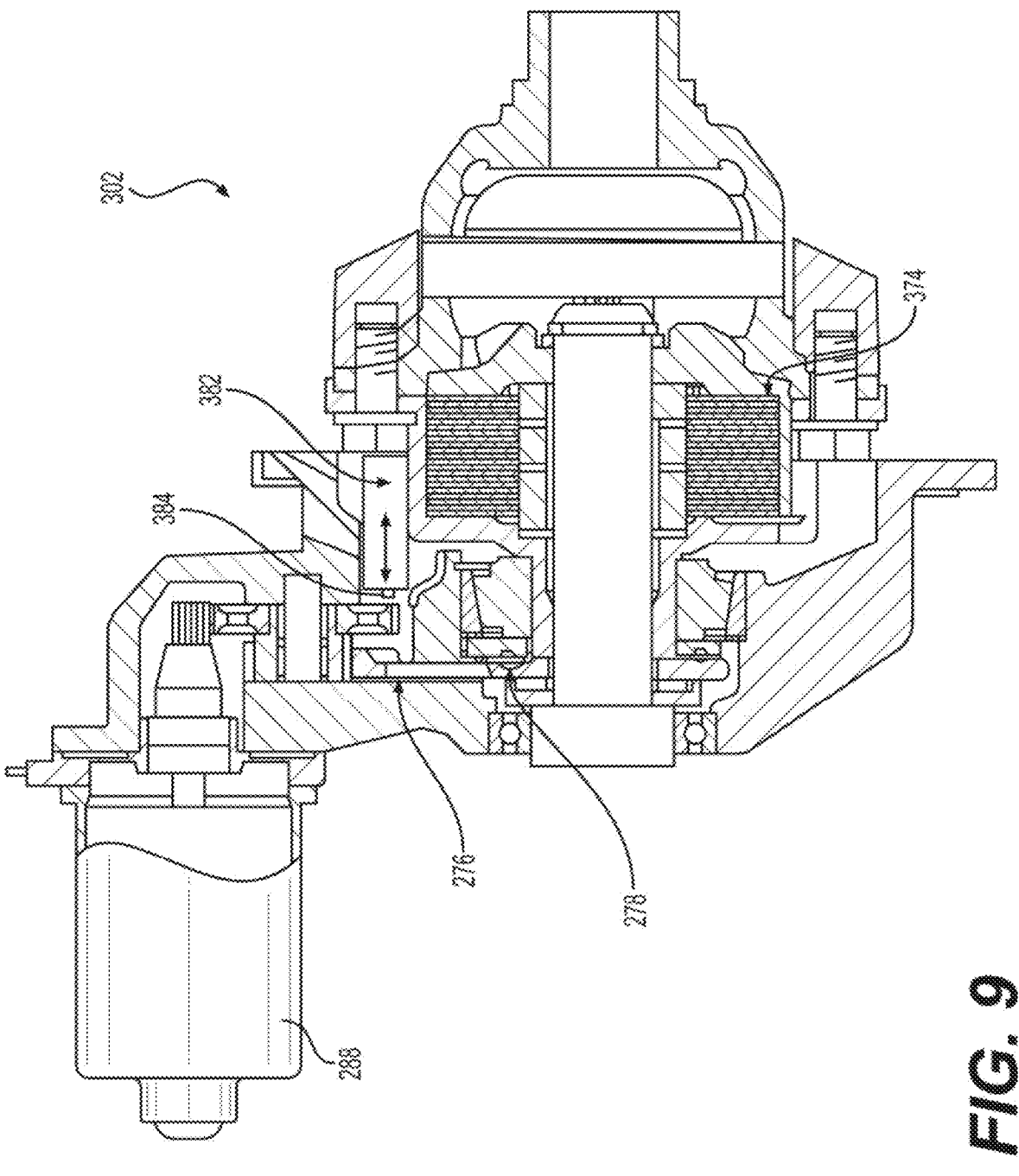
FIG. 9 is a cross-sectional view of an example construction of the differential assembly of FIG. 7.

With reference to FIGS. 7 to 9, the vehicle 40 includes a limited slip differential assembly 300 including the LSD 302 connected to driven wheels of the vehicle 40. In the present implementation, the differential assembly 300 drives the front wheels 44 of the vehicle 40. It should be understood that the differential assembly 300 could alternatively be used with the rear wheels 48 of the vehicle 40, or to any pair of wheels of any other type of vehicle. The differential assembly 300 includes the LSD 302, an actuator 372, and a solenoid 382. The differential assembly 300, including the LSD 302, is operatively connected to a control system 350 including the control unit 370 and one or more sensors. The actuator 372, the solenoid 382 and the sensors are electrically connected to the control unit 370.

Figure 10:
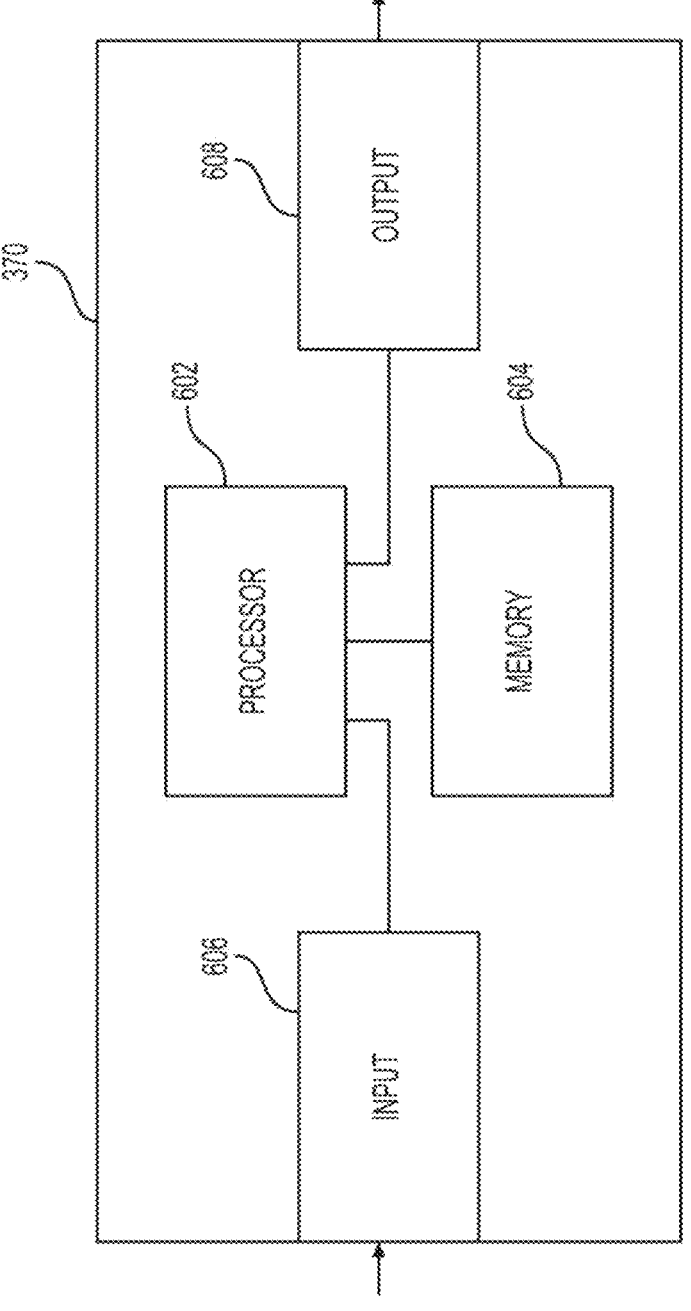
FIG. 10 is a block diagram of a control unit for the limited slip differential (LSD)

With additional reference to FIG. 10, an exemplary control unit 370 is illustrated in a block diagram. The control unit 370 includes a processor 602 operatively connected to a memory 604, an input port 606 and an output port 608. The processor 602 includes a plurality of co-processors. The memory 604 includes one or more memory modules. The input port 606 includes one or more input modules. Likewise, the output port 608 includes one or more output modules. The input port 606 and the output port 608 may be integrated as an input/output module.

By the present technology, the sensors include a front right suspension sensor $393_R$, a front left suspension sensor $393_L$, a rear right suspension sensor $395_R$, and a rear left suspension sensor $395_L$, shown schematically in FIG. 8. The front right suspension sensor $393_R$ is operatively connected to right front suspension assembly 46. The front left suspension sensor $393_L$ is operatively connected to left front suspension assembly 46. The rear right suspension sensor $395_R$ is operatively connected to rear right suspension assembly 50. The rear left suspension sensor $395_L$ is operatively connected to rear left suspension assembly 50. In the present implementation, each sensor $393_R$, $393_L$, $395_R$, $395_L$ is a rotational sensor connected to a corresponding suspension assembly 46, 50 that produces signals indicative of the position of the corresponding suspension assembly 46, 50. Each sensor $393_R$, $393_L$, $395_R$, $395_L$, is connected to a component of the corresponding suspension assembly 46, 50 and another component of the vehicle 40 that is rotatable relative to the suspension assembly component. The sensor $393_R$, $393_L$, $395_R$, $395_L$ can be connected between a variety of components, for example between a link of the suspension and a part of the frame, two links of the suspension, or a link of the suspension and the knuckle. The suspension position is then derived from the sensed angle between the two components.

It is contemplated that different types of sensors could be used in different implementations, including for sensing the suspension position or extension and/or a corresponding wheel position. In some cases, linear position sensors and/or sensors located in the shock absorber could be used.

Depending on the implementation, the sensors could also include one or more wheel speed sensors 376, 378, a vehicle speed sensor 380, a steering angle sensor 390, an accelerator control sensor 392, an engine torque monitor 394, a shifter position indicator 396, and a user command sensor 398. The wheel speed sensors 376, 378 are connected to the output shafts 322, 324. The wheel speed sensors 376, 378 may alternatively be connected to the front wheels 44, to the front half-shafts 98, or to any other suitable component from which the control unit 370 receives signals indicative of the rotational speeds of the left and right front wheels 44. The user command sensor 398 informs the control unit 370 of the state of the various toggle switches 59, 63 and 65. Some of these sensors may be present in some implementations and not present in some other implementations. All of these sensors, when present, are communicatively coupled with the control unit 370, to which they provide measurements and sensed information elements.

FIG. 8 illustrates a particular, non-limiting implementation of the LSD 302. The structure and operation of the non-limiting implementation of the LSD 302 is presented herein, but it is contemplated that the particular structure of the LSD 302 could vary in different implementations of the present technology. In the LSD 302 as shown on FIG. 8, the input shaft 90 is connected to a first bevel gear acting as an input gear 304. Rotation of the input shaft 90 causes a rotation of the input gear 304 that, in turn, causes a rotation of a second bevel gear, or ring gear 306. Rotation of the ring gear 306 causes a rotation of first clutch plates 308 and of a carrier 310. A shaft 312 connects the carrier 310 to a gear set that includes at least two (2) planet gears 314, 316 and sun gears 318, 320. An output shaft 322 is mounted to the sun gear 318, the shaft 322 and the sun gear 318 rotating together. Likewise, an output shaft 324 is mounted to the sun gear 320, the shaft 324 and the sun gear 320 rotating together. The output shafts 322 and 324 are operatively connected to the half shafts 98 via universal joints or joints of other types (not shown) contained in boot covers 326 and 328 (shown on FIG. 7).

The LSD 302 has second clutch plates 330. When the LSD 302 is not loaded, the clutch plates 308 and 330 are not compressed. The output shafts 322 and 324 may rotate at the same speed or at distinct speeds. When both output shafts 322 and 324 rotate at a same speed, they also both rotate at the same rate as the ring gear 306, the carrier 310 and the sun gears 318, 320. At that time, the planet gears 314 and 316 do not rotate about the axis of the shaft 312 (they only rotate about the axis of the ring gear 306, following the movement of the carrier 310). When the two output shafts 322 and 324 rotate at distinct speeds, a rotational difference of the sun gears 318 and 316 causes a rotation of the planet gears 314 and 316 about the axis of the shaft 312. In that case, torque from the input shaft 90 is unequally transferred to the output shafts 322 and 324 and, ultimately, to the left and right wheels 44.

The actuator 372 selectively compresses the clutch plates 308 and 330. This compression reduces, and eventually eliminates, a rotational speed difference between the ring gear 306 and the output shaft 324. If the clutch plates 308 and 330 are compressed to the point of eliminating any rotational speed difference between the ring gear 306 and the output shaft 324, the carrier 310 also rotates at the same speed as the output shaft 324. The planetary gears 314 and 316 cannot turn about the axis of the shaft 312 so the sun gear 318 and the output shaft 322 also rotate at the same speed as the output shaft 324. The LSD 302 is then effectively locked. In case of partial loading of the LSD 302, a moderate compression of the clutch plates 308 and 330 causes a reduction of a rotational speed difference between the ring gear 306 and the output shaft 324, without totally eliminating this difference.

The LSD 302 is thus clutch-type limited slip differential and is controllable to allow a predetermined maximum difference in rotational speeds between the left and right front wheels 44. It is contemplated that any other suitable type of LSD 302 may alternatively be used.

The LSD 302 is mechanically coupled to the actuator 372, which could variably be an electrical, hydraulic or magnetic actuator, that is electronically controlled by the control unit 370. To regulate the difference in rotational speeds between the left and right front wheels 44, the actuator 372 can vary the compression on the clutch plates 308 and 330 to vary the degree of engagement, or load, of the LSD 302. The LSD 302 may be engaged, i.e. loaded, when the control unit 370 detects a rock crawling mode or operation, as described below.

In at least one implementation, in order to prevent eventual slipping of the wheels 44, the control unit 370 may control the LSD 302 to be loaded before the actual detection of a rock crawling operation or in response to other sensed conditions. It can be said in such case that the LSD 302 is preloaded. In the context of the present disclosure, differences between the terms "load" and "preload" primarily relate to the circumstances under which the control unit 370 initiates the loading of the LSD 302. The LSD 302 operates essentially in the same manner whether it is loaded or preloaded. Application of a preload to the LSD 302 does not preclude further or increased loading of the LSD 302 in response to sensor signals received by the control unit 370.

The control unit 370 may cause the LSD 302 to act as an open differential (fully disengaged), a locked differential (fully engaged), or at any intermediate degree of engagement. The control unit 370 is electrically connected to the suspension sensors $393_{R,L}$ and $395_{R,L}$ as noted above, the control unit 370 being configured to control the degree of engagement based on signals from the suspension sensors $393_{R,L}$ and $395_{R,L}$.

FIG. 9 is a cross-sectional view of the differential assembly of FIG. 7. The actuator 372 includes an electric motor 288 that drives a gear set 276. A rotational motion of the gear set 276 is translated into an axial motion by a ball ramp 278. This axial motion is used to apply a pressure generated by the electric motor 288 to compress the clutch plates 308 and 330 of a clutch 374. This compression of the clutch 374 loads the LSD 302 to reduce the relative slip between the left and right half shafts 98. Sufficient compression of the clutch 374 may effectively lock the LSD 302. However, even under maximum compression, the clutch 374 may slip in some implementations, under severe conditions. Consequently, depending on the torque from the input shaft 90 being applied to the LSD 302 and depending on characteristics of the clutch 374, the LSD 302 may not lock to an absolute degree. In the context of the present disclosure, the LSD 302 is considered locked when maximum torque is applied on the clutch 374 although at the time a modest relative slip may still be present between the left and right half shafts 98.

Consequently, the "locking of the LSD 302" should not be understood in the absolute and should not require a mechanism to lock the LSD 302 via a mechanical interlock, even though in some embodiments, the LSD 302 may comprise such mechanism to lock the LSD 302 via a mechanical interlock.

In order to prevent overheating of the electric motor 288, the solenoid 382 having a tooth 384 at its end may be energized so that the tooth 384 meshes with a largest gear 386 of the gear set 276, thereby locking the gear set 276, the ball ramp 278 and the clutch 374 in a selected load position. As a result, the electric motor 288 no longer needs to be energized to maintain the load to the LSD 302. In an implementation, the solenoid 382 may be energized to lock the LSD 302 when the control unit 370 determines that loading has been applied for at least a predetermined time period duration. It should be observed that energizing the solenoid 382 requires much less current than energizing the electric motor 288. De-energizing the solenoid 382 causes it to retract, releasing the tooth 384 from the largest gear 386 of the gear set 276 and releasing the load to the LSD 302. In a variant, the solenoid 382 may be configured so that its tooth 384 meshes with the largest gear 386 of the gear set 276 when the solenoid 382 is not energized, energizing the solenoid 382 thus causing a release of the gear set 276 and unlocking of the clutch 374. In other embodiments, the electric motor 288 may be back driven.

In the present implementation, maximum compression of the clutch 374 is selectively applied by the electric motor 288, the gear set 276 and the ball ramp 278 prior to energizing the solenoid 382. In the same or another implementation, the solenoid 382 may also be energized to lock the LSD 302 when a user manually activates the toggle switch 63 to select to lock the LSD 302, as indicated by the user command sensor 398 that informs the control unit 370 of a user request to lock the LSD 302. In such case, the user request to lock the LSD 302 may optionally cause a maximum load of the LSD 302 by maximum compression of the clutch 374 by the electric motor 288, the gear set 276 and the ball ramp 278 prior to energizing the solenoid 382.

Other implementations of the differential assembly 300 and of the LSD 302 are also contemplated. The present technology is not limited to the particular implementation illustrated on FIGS. 7 to 10. In particular, a differential assembly that does not contain a ball ramp or clutch plates is also contemplated.

According to one aspect of the present technology, the control system 350 is configured to control the LSD 302 based on a left-right (lateral) imbalance or difference in suspension positions. Such a condition may indicate that the vehicle 40 is being operated under rock crawling conditions and/or indicate that the traction quality of the vehicle 40 has been reduced. For example, a relatively large difference between compression of the right and left front suspension assemblies 46 could indicate that one of the front wheels is compressed as it is climbing over a rock or bump, while the other front wheel is dangling in a largely extended position.

In the present implementation, the suspension positions as described herein correspond to compression (sometimes referred to as "bump") or extension (sometimes referred to as "droop") measured or sensed in one or more suspension assemblies. It is also contemplated that control system 350 and the below described methods could be implemented based on a measured or sensed position of the wheels relative to the frame 42 of the vehicle 40.

The control unit 370 uses suspension assembly position information from one or more suspension sensors $393_R$, $393_L$, $395_R$, $395_L$ to control the limited slip differential assembly 300. Based on a comparison between the extensions of the front suspension assemblies 46 or the rear suspension assemblies 50, the control unit 370 generates a control signal to be sent to the LSD 302 to selectively control locking thereof.

According to another aspect of the present technology, the control system 350 is also configured to control the LSD 302 based on a front-rear (longitudinal) imbalance or difference in suspension positions. Such a condition may also indicate that the vehicle 40 is being operated under rock crawling conditions and/or indicate that the traction quality of the vehicle 40 has been reduced. For instance, a front-rear imbalance could correspond to a position of the vehicle 40 where the front wheels 44 are moving up over an obstacle while the rear suspension assemblies 50 are extending. The load of the vehicle 40 is then supported on the front wheels 44 and handling of the vehicle 40 may need to be adjusted.

Figure 11:
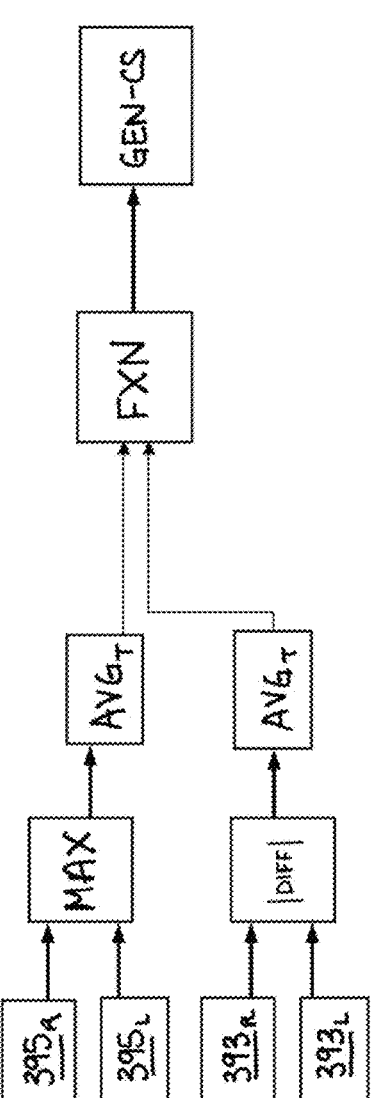
FIG. 11 is a block diagram showing internal operations of the control unit for controlling the LSD.
Figure 11:

FIG. 11 illustrates a block diagram 499 showing internal operations of the control unit 370, to further illustrate generating a control signal and selectively locking the LSD 302 according to an implementation. The block diagram 499 illustrates shows that up to four inputs are used by the control unit 370 to generate the control signal to selectively lock the LSD 302. It is contemplated that, in some implementations, the control unit 370 may use additional inputs for control signal generation.

Signals from the sensors $393_R$, $393_L$, $395_R$, $395_L$ are received by the control unit 370. For the rear sensors $395_R$, $395_L$, a maximum value (MAX) is selected between the right and left suspension assemblies 50 as the representative value. For the front sensors $393_R$, $393_L$, an absolute value of the difference (DIFF) between the right and left suspension assemblies 46 is determined. For both the rear maximum value and the front difference value, the values are averaged (AVG$_T$) over some pre-determined sampling window in order to smooth sensor noise. In other embodiments or applications, an absolute value of the difference (DIFF) between the right and left suspension assemblies may be selected for the rear sensors $395_R$, $395_L$ and/or a maximum value (MAX) may be selected for the front sensors $393_R$, $393_L$ as the representative value.

The control unit 370 then checks the averaged value against a control function and/or look-up table to determine if the suspension positional values correspond to values requiring a load on the LSD 302 to be changed. The control signal is then generated (GEN-CS). In most cases, the LSD 302 will be already operating under some partial load (referred to as "pre-loading") and the control signal will cause the load to be increased on the LSD 302.

With additional reference to FIG. 12, a method 400 of controlling the LSD 302 by the control system 350 and the control unit 370 will now be described. Briefly, the method 400 includes sensing the positions of the suspension assemblies 46, 50. Based on the positions of some or all of the assemblies 46, 50, the control unit 370 generates a control signal for controlling the LSD 302. The control unit 370 may control the LSD 370 in response to a right-left imbalance or a front-rear imbalance between the suspension assemblies 46, 50.

The method 400 begins, at step 410, with receiving sensor signals from one or more of the sensors $393_R$, $393_L$, $395_R$, $395_L$ which are indicative of the positions of the suspension assemblies 46, 50. In some implementations, the method 450 could begin with receiving sensor signals indicative of positions of the right and left ground-engaging members, i.e. the wheels 44, 48.

The method 400 continues, at step 430, with generating a control signal at least partly based on the sensor signals. In the illustrated implementation (see FIG. 11), generating the control signal includes averaging the positions of some predetermined time period to reduce noise in the signals, and accessing a control function and/or table look up to determine control values. Different methods of generating the control signal are also contemplated, depending on the implementation.

The method 400 then continues, at step 420, with controlling selective locking of the LSD 302 based on the control signal. As described above, the LSD 302 is selectively locked by increasing a load on the LSD 302, although this could vary depending on the particulars of the LSD embodiment.

In some implementations, the method 400 could further include determining a positional difference between the right and left front suspension assemblies 46 (or similarly the wheels 44). In such an implementation, generating the control signal is then based on the positional difference. As noted above, different extension or droop positions between right and left side suspension assemblies 46 or 50 may signal a rocky or uneven terrain requiring additional grip, even if other operational variables (i.e. wheel speed, engine torque) are withing acceptable ranges.

In some such implementations, the control signal, based on the positional difference between the right and left front suspension assemblies 46, could then be indicative of a traction quality of the wheels 44.

In some implementations, determining the positional difference between the right and left front suspension assemblies 46 could include determining a first positional difference and determining a subsequent a second positional difference. The method 400 could then include generating the control signal based on the first positional difference and the second positional difference. By determining multiple positional differences over a time span, the control signal can be generated in response to changes in operating or terrain conditions.

In some implementations, the method 400 could include increasing a load on the LSD 302 in response to the second positional difference being greater than the first positional difference.

In some implementations, the method 400 could further include increasing the load on the LSD in response to a difference between the second positional difference and the first positional difference being greater than above a predetermined threshold.

The pre-determined threshold could be selected and applied in a variety of manners. According to one implementation, the pre-determined threshold could correspond to between 10% and 30% of a travel of right and left front suspensions 46. It is noted that 100% of travel corresponds to a full droop or extended position, and 0% of travel is the fully compressed position of the corresponding suspension assembly 46, 50. In some implementations, the pre-determined threshold for increasing the load on the LSD 302 corresponds to about 10% of the travel of the right and left front suspensions 46.

The pre-determined threshold can also be set by length of suspension extension. In some implementations, the pre-determined threshold could be between about 60 mm and about 90 mm. More particularly, the pre-determined threshold could be about 75 mm in some cases.

The control unit 370 could also issue a command to load the LSD 302 or control the LSD 302 according to rock crawling parameters in response to other indications from the vehicle, for instance in response to a user command to lock the LSD 302 via the instrument panel 61. The LSD 302 may thus be loaded according to rock crawling parameters even though at the time the suspension positions may be within a normal range of operation.

The method 400 could then further include receiving an indication of a riding mode selection, for example from the instrument panel 61, and generating the control signal and controlling the selective locking of the LSD 302 in response to the riding mode selection. For instance, the operator may select a rock crawling mode from the instrument panel 61.

In some implementations, the method 400 could further include changing riding mode. In response to another riding mode of the vehicle 40 having been selected, generating another mode control or subsequent signal could be based on, for instance, one or more vehicle sensor signals. Subsequent controlling selective locking of the LSD 302 could then be based on the subsequent control signal.

In some implementations, the method 400 could further include receiving one or more vehicle sensor signals indicative of operational condition(s) of the vehicle 40, the control signal being further generated based on the vehicle sensor signals.

Depending on the implementation and/or particulars of the vehicle 40, the operational condition could include one or more of: a speed of front ground-engaging members; a steering indication; an accelerator indication; a gear position; an engine torque; and a speed of the vehicle.

For instance, in some implementations, the control unit 370 could receive signals and/or measurements from the wheel speed sensors 376, 378, the vehicle speed sensor 380, the accelerator control sensor 392, the engine torque monitor 394 and the shifter position indicator 396. These signals and/or measurements could be used additional parameters in determining the control signal by the control unit 370.

In another non-limiting example, a speed of the vehicle 40 could also be determined by the control system 350 and used as an additional parameter in generating the control signal for selectively locking the LSD 302. The speed of the vehicle 40 could be provided to the control unit 370 by the vehicle speed sensor 380. Alternatively, the control unit 370 could receive from the wheel speed sensors 376, 378 the rotational speeds of the left and right wheels 44. This measurement provided to the control unit 370 could be used to determine an average of the rotational speeds of the left and right wheels 44 to determine the speed of the vehicle 40, based on this average and further based on a dimension of the left and right wheels 44.

It is also contemplated that the control unit 370 could additionally receive an engine torque measurement from the engine torque monitor 394. In an implementation, the engine torque monitor 394 could determine the engine output torque based on admitted air and fuel measurements and based on an ignition timing advance. Use of a torque sensor operatively connected to the engine 62 is also contemplated in some implementations. In some implementations, engine torque could then also be used in generation of the control signal by the control unit 370.

In some such implementations, a pre-determined threshold for selectively locking the LSD 302 could be at least partially a function of a predicted engine torque of the engine 62. Broadly, in at least some implementations, the predicted engine torque could be determined based on the engine output torque measured by the engine torque monitor 394 and an accelerator position and/or rate of change of the accelerator position. More details of one non-limiting method and system for determining the predicted engine torque of the engine 62 can be found in U.S. Pat. No. 11,383,599, issued Jul. 12, 2022, the entirety of which is incorporated by reference herein.

It is further contemplated that the LSD 302 could be selectively controlled based first on the sensor signals from the suspension sensors $393_R$, $393_L$, $395_R$, $395_L$ and then simultaneously or subsequently changing or adjusting the LSD control based on one or more vehicle sensor signals.

Generating the control signal could then further include determining a first load to be applied to the LSD 302 based on the sensor signals from the sensors $393_R$, $393_L$, $395_R$, $395_L$ (or a subset thereof) and determining a second load to be applied to the LSD 302 based on one or more vehicle sensor signals. The method 400 could then further include controlling selective locking of the LSD 302 based on the control signal includes applying a sum of the first load and the second load to the LSD 302.

At least some implementations of the method 400 can be configured to determine rock crawling or the need for selectively locking the LSD 302 based on traction quality based more on the front-rear (longitudinal) imbalance.

In some implementations, the method 400 could further include determining an average compression position of the right and left suspensions 46, 50, or correspondingly the right and left wheels 44, 48.

In such a case, the method 400 could then further include generating the control signal based on the average compression position. This control signal can be used as an indication of a traction characteristic or quality of the right and left wheels 44, 48.

In some implementations, determining the average compression position includes determining an average front compression position of right and left front suspensions 46 (or the corresponding wheels 44) and determining an average rear compression position of the right and left rear suspensions 50 (or the corresponding wheels 48). The front and rear average compression positions may then be used to generate additional or alternative control signals.

In response to the average compression position approaching a full droop position (approaching 100% travel), the method 400 could further include controlling selective locking of the LSD 302 by increasing a load thereon.

The method 400 could further include controlling selective locking and/or increasing a load on the LSD 302 in response to the average compression position being above a pre-determined compression threshold.

In some implementations, the pre-determined compression threshold corresponds to a suspension droop position of between 60% and 80% (100% droop positions corresponding to a fully extended position). More specifically, in some implementations the pre-determined compression threshold corresponds to a suspension droop position of 70%.

The pre-determined compression threshold could also be measured against the extension length of the corresponding suspension assembly 46, 50. In some implementations, the pre-determined compression threshold is between about 245 mm and about 325 mm. More specifically, in some implementations the pre-determined compression threshold is about 285 mm.

It is also contemplated that the threshold could depend on both the compression as sensed and vehicle operational conditions. For instance, the pre-determined compression threshold could be a function of a predicted engine torque of the engine.

In some implementations, the control unit 370 could also determine the proper time or moment to remove the load to the LSD 302 according to a plurality of parameters.

It is contemplated that the method 400 could include additional or different steps, either to perform additional functions and/or to perform the steps described above.

With reference to FIG. 13, a method 450 for determining a traction quality of the vehicle 40 will now be described. Broadly, the method 450 determines a traction quality of the current operation of the vehicle 40, based on the relative positions of the suspension assemblies 46, 50. The traction quality determination may then be used to alert an operator of the vehicle 40 and/or automatically trigger a rock crawling mode to be initiated, for example.

The method 450 begins, at step 460, with receiving, by the control unit 370, sensor signals from one or more of the sensors $393_R$, $393_L$, $395_R$, $395_L$ which are indicative of the positions of the suspension assemblies 46, 50. In some implementations, the method 450 could begin with receiving sensor signals indicative of positions of the right and left ground-engaging members, i.e. the wheels 44, 48.

The method 450 continues, at step 470, with determining a value related to suspension assembly and/or wheel positions. In the present implementation, the determined value is a positional difference between the right and left front suspension assemblies 46. Specifically, an absolute value of the droop (extension) length of each of the right and left front suspension assemblies 46 is calculated. In some implementations, the positional difference could be determined for the right and left front wheels 44.

In other non-limiting implementations, the determined value could be an average position of the right and left front suspension assemblies 46. Specifically, an averaged value of the droop (extension) length of each of the right and left front suspension assemblies 46 is calculated. In some implementations, the average value could be determined for the right and left front wheels 44.

In some implementations, the average position of the right and left front suspension assemblies 46 could be compared to the average position of the right and left rear suspension assemblies 50.

The method 450 continues, at step 480, with generating a control signal representative of the traction quality of the vehicle 40, the generating being based at least partly on the determined value.

In at least some implementations, the method 450 could further include generating an indication representative of the traction quality based on the control signal and communicating the indication to an operator of the vehicle 40. For instance, the indication could be presented on a display in the vehicle 40 or be communicated by a sound produced by the vehicle 40. As one non-limiting example, a notification indicating poor traction quality could be shown to the operator in order for the operator to decide whether or not to manually activate a rock crawling mode.

In at least some implementations, the method 450 could further include controlling selective locking of the LSD 302 based on the control signal representative of the traction quality. For instance, the control unit 302 could automatically activate a rock crawling mode or automatically initiate locking the LSD 302 based on an indication of poor traction quality, without requiring action by the operator.

It is contemplated that the method 450 could include additional or different steps, either to perform additional functions and/or to perform the steps described above.

According to the present implementation, operations of the methods 400 and 450 are configured to be processed by the processor 602 coupled to the memory 604 of the control unit 370.

Modifications and improvements to the above-described implementations of the present technology may become apparent to those skilled in the art. For example, it is contemplated that the LSD 302 may be mounted at the rear of the vehicle 40 and operatively connected to the rear wheels 48, whether the vehicle 40 has a two-wheel drive or an all-wheel drive configuration. The foregoing description is intended to be exemplary rather than limiting. The scope of the present technology is therefore intended to be limited solely by the scope of the appended claims.

What is claimed is:

1. A control system for controlling a limited-slip differential (LSD) of a vehicle,
the vehicle having an engine and left and right ground-engaging elements, the vehicle having the LSD operatively connectable to a driveshaft and to the left and right ground-engaging elements, left and right suspension assemblies connected to the left and right ground-engaging elements, the LSD being adapted for transferring torque from the driveshaft to the left and right ground-engaging elements,
the control system comprising:
at least one sensor of at least one parameter indicative of one of:
an extension position of at least one of the right and left suspensions, and
a vertical position of at least one of the right and left ground-engaging members; and
a control unit operatively connected to the LSD and to the at least one sensor, the control unit being configured to execute:
receiving sensor signals from the at least one sensor,
generating a control signal at least partly based on the sensor signals, and
controlling selective locking of the LSD based on the control signal.

2. The control system of claim 1, wherein the control unit is further configured to execute:
determining a positional difference between one of:
positions of the right and left suspensions, and
positions of the right and left ground-engaging members.

3. The control system of claim 2, wherein generating the control signal is based on the positional difference, the control signal being indicative of a traction quality of the right and left ground-engaging members.

4. The control system of claim 2, wherein:
the positional difference is a first positional difference;
the control unit is further configured to execute:
determining a second positional difference between one of:
positions of the right and left suspensions, and
positions of the right and left ground-engaging members,
the second positional difference being determined subsequent to the first positional difference;
generating the control signal is based on the first positional difference and the second positional difference; and
in response to the second positional difference being greater than the first positional difference, controlling selective locking of the LSD comprises increasing a load on the LSD.

5. The control system of claim 4, wherein the control unit is configured to execute increasing the load on the LSD in response to a difference between the second positional difference and the positional difference being greater than above a pre-determined threshold.

6. The control system of claim 5, wherein the pre-determined threshold corresponds to between 10% and 30% of a travel of right and left front suspensions.

7. The control system of claim 5, wherein the pre-determined threshold is a function of a predicted engine torque of the engine.

8. The control system of claim 1, wherein the control unit is further configured to execute:
determining an average compression position of:
the right and left suspensions, and
the right and left ground-engaging members.

9. The control system of claim 8, wherein the control unit is further configured to execute:
generating the control signal based on the average compression position, the control signal being indicative of a traction characteristic of the right and left ground-engaging members.

10. The control system of claim 8, wherein the control unit is further configured to execute:
in response to the average compression position approaching a full droop position, controlling selective locking of the LSD by increasing a load on the LSD.

11. The control system of claim 8, wherein the control unit is further configured to execute:
in response to the average compression position being above a pre-determined compression threshold, controlling selective locking of the LSD by increasing a load on the LSD.

12. The control system of claim 11, wherein the pre-determined compression threshold corresponds to a suspension droop position of between 60% and 80%.

13. The control system of claim 11, wherein the pre-determined compression threshold is a function of a predicted engine torque of the engine.

14. The control system of claim 1, wherein:
the control unit is further configured to execute receiving at least one vehicle sensor signal indicative of at least one operational condition of the vehicle; and
generating the control signal further comprises generating the control signal based on the at least one vehicle sensor signal.

15. The control system of claim 14, wherein the at least one operational condition includes at least one of:
a speed of front ground-engaging members;
a steering indication;
an accelerator indication;
a gear position;
an engine torque; and
a speed of the vehicle.

16. The control system of claim 14, wherein:
generating the control signal further comprises:
determining a first load to be applied to the LSD based on the sensor signals, and
determining a second load to be applied to the LSD based on the at least one vehicle sensor signal; and
controlling selective locking of the LSD based on the control signal comprises applying a sum of the first load and the second load to the LSD.

17. The control system of claim 14, wherein the control unit is further configured to execute:
receiving an indication of a riding mode selection;

21 in response to a pre-determined riding mode of the vehicle having been selected:

generating the control signal based on the sensor signals, and controlling selective locking of the LSD based on the control signal; and in response to an other riding mode of the vehicle having been selected:

generating an other mode control signal based on the at least one vehicle sensor signal, and controlling selective locking of the LSD based on the other mode control signal.

18. The control system of claim 1, wherein the control unit is further configured to execute:

receiving an indication of a riding mode selection; and in response to the indication of riding mode selection of the vehicle having been selected:

generating the control signal, and controlling selective locking of the LSD based on the control signal.

19. A method of controlling a limited slip differential (LSD) of a vehicle, the vehicle having an engine and left and right ground-engaging elements, the vehicle having the LSD operatively connectable to a driveshaft and to the left and right ground-engaging elements, left and right suspension assemblies connected to the left and right ground-engaging elements, the LSD being adapted for transferring torque from the driveshaft to the left and right ground-engaging elements, the method comprising:

receiving, by a control unit operatively connected to the LSD, sensor signals from at least one sensor of at least one parameter indicative of one of:

an extension position of at least one of the right and left suspensions, and a vertical position of at least one of the right and left ground-engaging members;

generating, by the control unit, a control signal at least partly based on the sensor signals; and controlling, by the control unit, selective locking of the LSD based on the control signal.

20. A control system for determining a traction quality of a vehicle, the vehicle having an engine and left and right ground-engaging elements, left and right suspension assemblies connected to the left and right ground-engaging elements, the control system comprising:

at least one sensor of at least one parameter indicative of positions of one of:

the right and left suspensions, and the right and left ground-engaging members; and a control unit operatively connected to the at least one sensor, the control unit being configured to execute:

receiving sensor signals from the at least one sensor;

determining a value of at least one of:

a positional difference between at least one of the right and left suspensions and the right and left ground-engaging members, and an average position of at least one of the right and left suspensions and the right and left ground-engaging members; and generating a control signal representative of the traction quality of the vehicle at least partly based on the value.

* * * * *